March 3, 1953   H. T. KRAFT   2,630,198
FLUID-OPERATED CLUTCH OR BRAKE
Filed July 22, 1949   3 Sheets-Sheet 1

INVENTOR
Herman T. Kraft
BY Evans & McCoy
ATTORNEYS

March 3, 1953 H. T. KRAFT 2,630,198
FLUID OPERATED CLUTCH OR BRAKE
Filed July 22, 1949 3 Sheets-Sheet 2

INVENTOR
Herman T. Kraft
BY Evans & McCoy
ATTORNEYS

March 3, 1953  H. T. KRAFT  2,630,198
FLUID OPERATED CLUTCH OR BRAKE
Filed July 22, 1949  3 Sheets-Sheet 3

INVENTOR
*Herman T. Kraft*
BY *Evans & McCoy*
ATTORNEYS

Patented Mar. 3, 1953

2,630,198

UNITED STATES PATENT OFFICE 2,630,198

FLUID OPERATED CLUTCH OR BRAKE

Herman T. Kraft, Akron, Ohio, assignor to The General Tire and Rubber Company, Akron, Ohio, a corporation of Ohio Application July 22, 1949, Serial No. 106,242

21 Claims. (Cl. 192—88)

This invention relates to frictional torque transmitting devices of the inflatable annulus type. More particularly, the invention is concerned with devices such as couplings, brakes and clutches having inflatable annuli disposed between concentrically arranged rotatable members, the annuli being adapted for expansion or contraction in establishing and interrupting the driving connection between the parts.

It is frequently desirable to mount or secure the inflatable annulus of a coupling, brake or clutch on the inner rotatable member so that the driving connection is established by radial outward expansion of the annulus. Such expansion is customarily effected as by the introduction of high pressure pneumatic fluid such as air into an annular or circumferential chamber or chambers formed internally of the rubber annulus. It is also desirable to provide the annulus with a body portion of relatively thick section on which is formed the friction face, or to mount friction blocks or shoes on the friction face, the wear between the parts of the coupling or clutch being taken by the thick sectioned body portion or by the shoes.

Centrifugal force developed in the thick sectioned body portion of the annulus, or in the friction shoes and related parts when such are employed, tends to move the annulus toward or to hold the annulus in radially distended position during rotation of the device at high speed. Difficulty is therefore experienced in completely releasing the driving connection between the clutch parts and in preventing rubbing of the shoes or friction face on the companion member of the device, the inherent resiliency of the inflatable rubber annulus being often insufficient independently to overcome the centrifugal forces developed.

It is therefore a principal object of the present invention to provide an improved torque transmitting device of the inflatable annulus type in which means is provided for contracting the annulus upon the release of internal pneumatic pressure so that the frictional surfaces or shoes of the annulus are withdrawn from the opposing friction face rapidly and simultaneously around the entire circumferential extent of the annulus. As a preferential arrangement, the invention contemplates a device of the character mentioned in which resilient elements such as metal springs are combined with the inflatable annulus so as normally to hold the annulus in contracted condition and resiliently to bias the annulus to return to retracted condition when the annulus is distended. An effective and useful arrangement is one in which the resilient elements are in the form of reversely bent or C-shaped springs that are shaped to closely embrace the curved or convex sides of the annulus, the springs being spaced uniformly about the entire circumferential extent of the annulus. The springs are desirably arranged in pairs, one on each side of the annulus, the ends of each pair being connected by rigid cross elements preferably carried by or bonded to the annulus.

Another object of the invention is to provide a so-called universal annulus which can be either mounted on the internal member of a clutch or coupling assembly for expansion against the outer member of the assembly in establishing a driving connection, or mounted on the outer member of a clutch or coupling for contraction against the inner member in establishing a driving connection. Manufacture of a line of torque transmitting devices of the inflatable annulus type is greatly facilitated by the present annulus that can be used in either an expanding or a contracting type of clutch or coupling. Besides the advantages incident to original manufacture, the provision of a universal annulus of the character mentioned simplifies problems of handling, storing and servicing clutches and couplings in the field since the number of components is reduced.

Other objects and advantages of the invention relate to certain details of construction and combinations and arrangements of parts having to do with the general improvement of torque transmitting devices as well as simplicity and economy. In the further description of the invention, reference is made to the accompanying drawings forming a part of the specification. Like parts throughout the several views are indicated by the same letters and numerals of reference.

Figure 1:
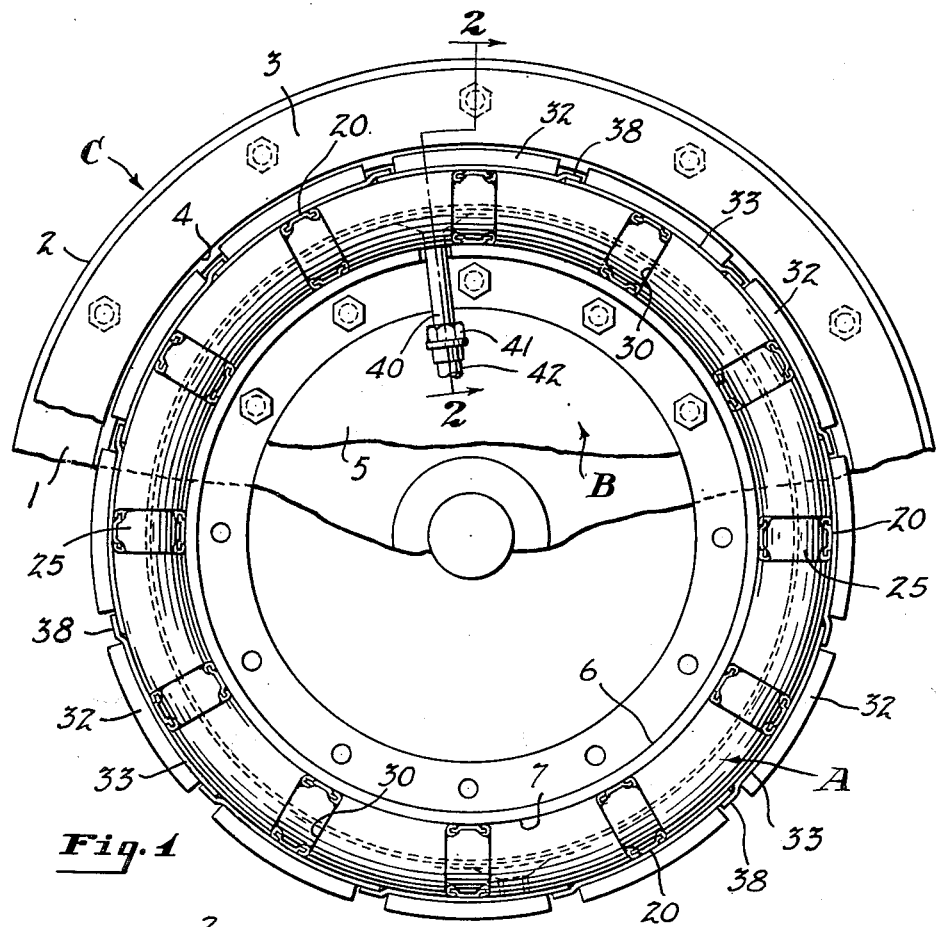
Figure 1 is an elevational view, with parts broken away and removed, of a torque transmitting device embodying principles of the present invention and having an inflatable annulus that expands radially outward in establishing a driving connection between the parts.
Figure 2:
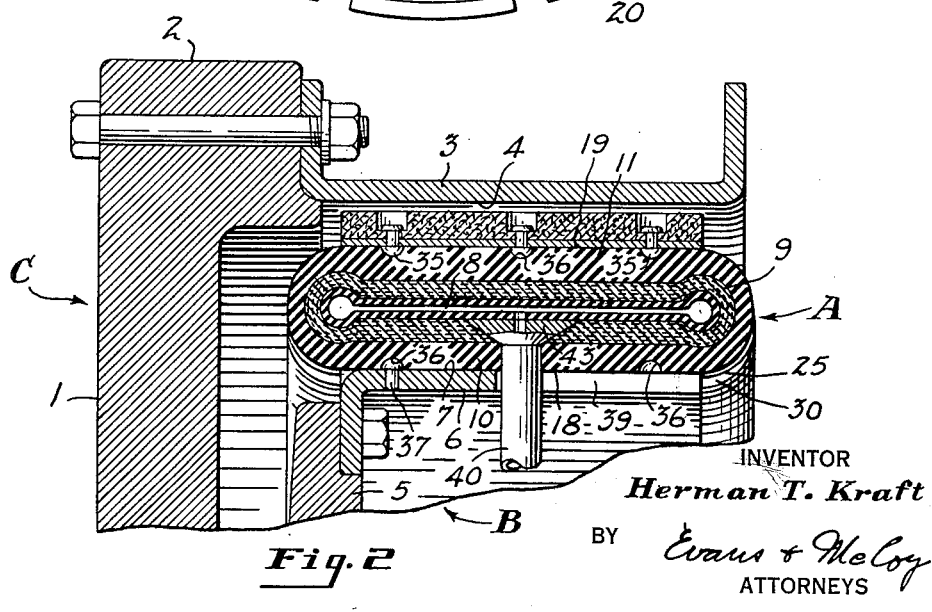
Fig. 2 is a fragmentary sectional detail, with parts broken away and removed, taken substantially along the line 2—2 of Fig. 1 and enlarged with respect to that figure.
Figure 3:
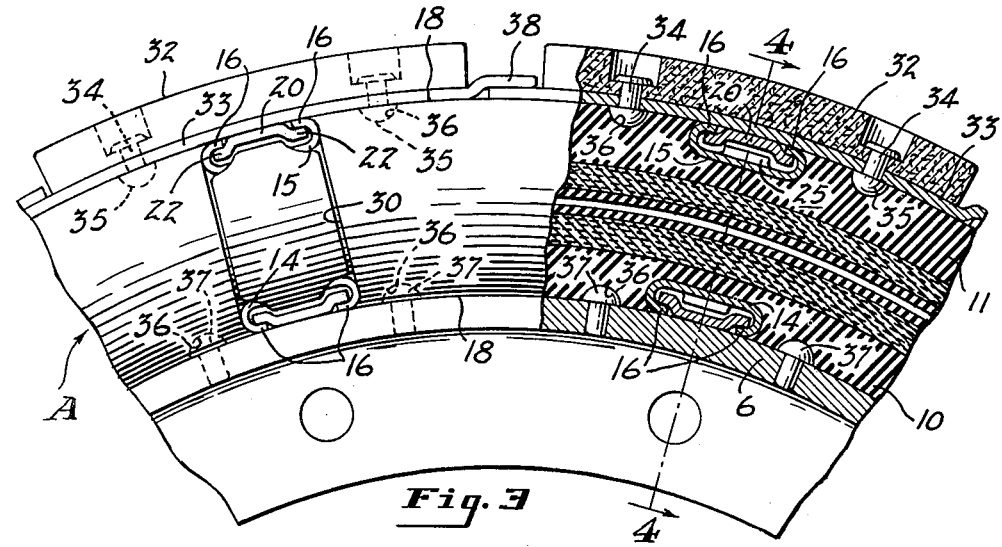
Fig. 3 is an enlarged fragmentary side elevational detail, partly in section and with parts broken away and removed, showing a portion of the inflatable annulus and mounting ring therefor used in the device of Figs. 1 and 2.
Figure 4:
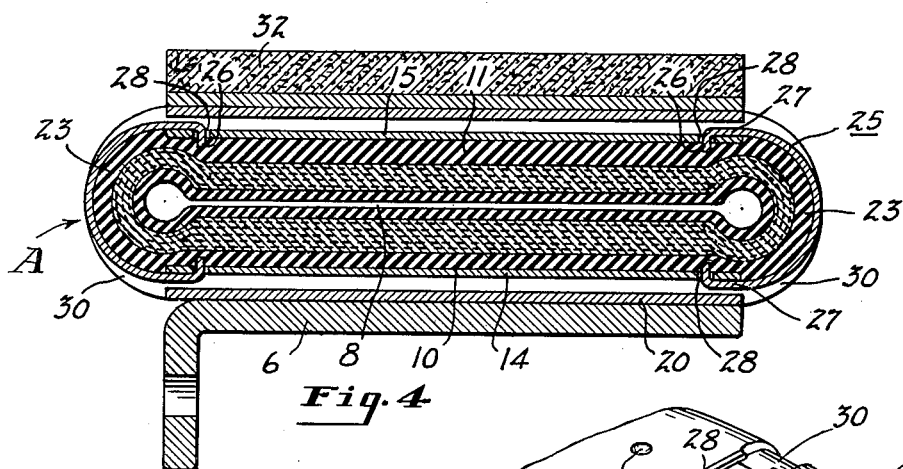
Fig. 4 is a sectional detail taken substantially along the line indicated at 4—4 of Fig. 3.
Figures 5, 6, 7:
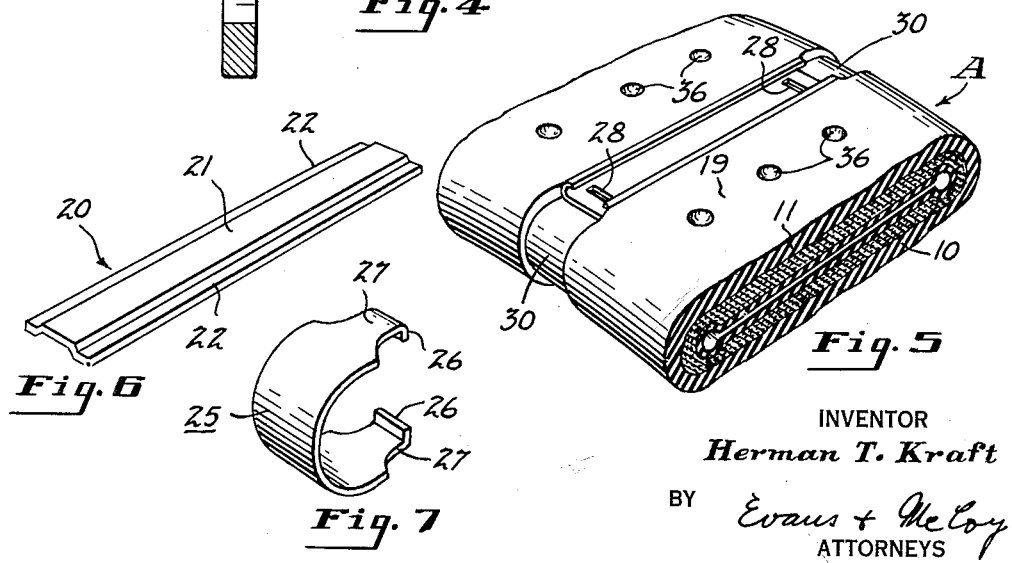
Fig. 5 is a perspective detail showing a fragmentary portion of the inflatable annulus.
Fig. 6 is a perspective detail showing one of the metal retaining elements.
Fig. 7 is a perspective detail of one of the C-shaped springs or contractors that bias the annulus toward contracted position or shape.
Figure 8:
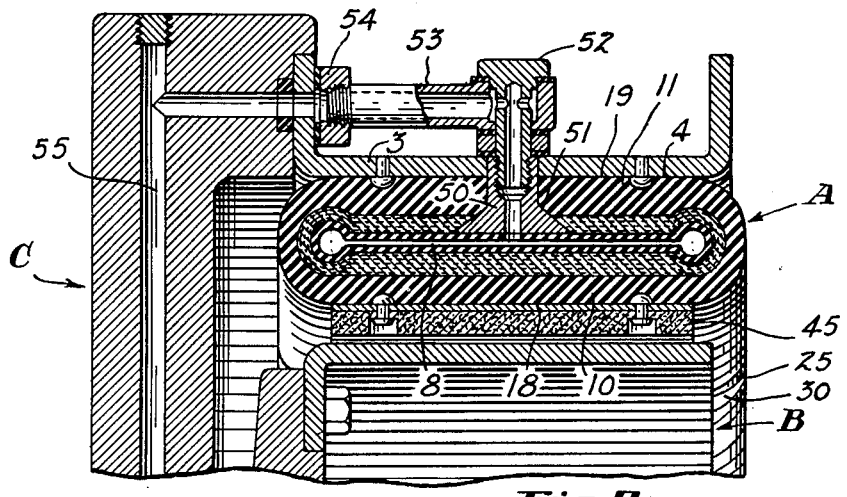
Figure 9:
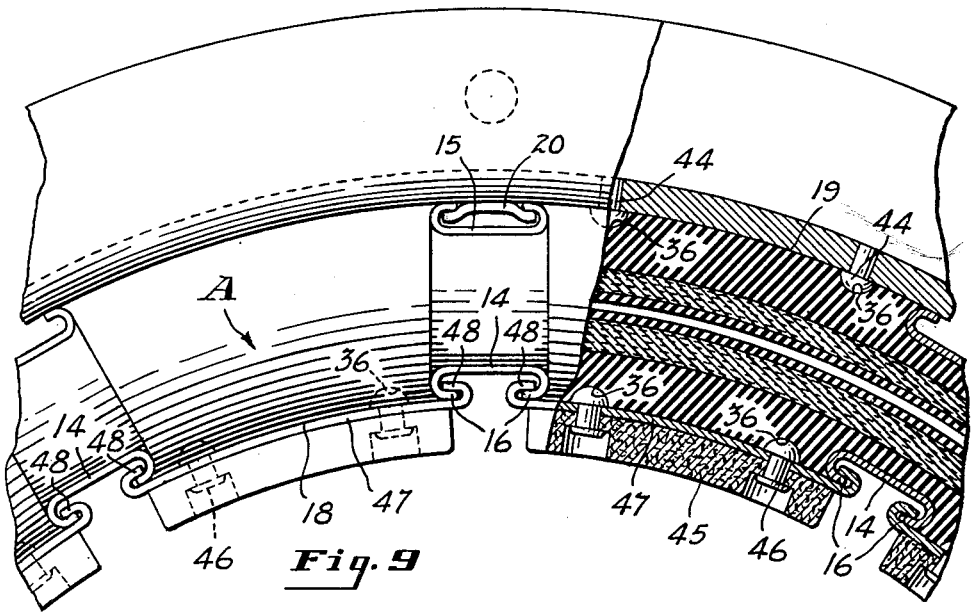

Fig. 8 is a sectional detail similar to Fig. 2 showing a modification of the invention in which the inflatable annulus is mounted on the external rotatable member and contracts radially inward in establishing a driving connection between the parts; and Fig. 9 is an enlarged fragmentary side elevational detail, partly in section and with parts broken away and removed, showing a portion of the inflatable annulus of Fig. 8 and the mounting ring therefor.

The present invention is illustrated in the drawings in connection with clutches or disconnectable couplings each of which comprises an inflatable annulus A disposed between an inner rotatable member B and an outer rotatable member C. The rotatable members are mounted on aligned shafts. The outer member comprises a circular disc 1 having a hub secured to one of the shafts and a rim portion 2 to which is bolted a cylindrical drum 3 of channel cross-section. The channel of the drum faces outwardly and the inside of the drum provides a cylindrical surface 4 that either carries or is frictionally engaged by the expansible annulus A.

The inner rotatable member B comprises a circular disc 5 having a central hub secured on the other shaft for rotation therewith. A flanged cylindrical drum 6, formed as by pressing or stamping steel plate, is bolted or otherwise secured to the outer peripheral edge of the disc member 5. Outwardly directed cylindrical face 7 on the drum 6 of the inner rotatable member, which either carries or is frictionally engaged by the annulus, is thus disposed concentrically within and in spaced confronting relation to the inwardly directed cylindrical face 4 of the outer rotatable member.

The inflatable annulus A which is disposed in the annular space between the rotatable members may be of either the expanding type or of the contracting type. If of the expanding type, shown in Figs. 1 through 7, it is secured to the drum 6 of the inner rotatable member and, upon inflation, is arranged to engage frictionally the cylindrical surface 4 of the outer rotatable member in establishing a resilient drive between the parts of the coupling. If of the contracting type, illustrated in Figs. 8 and 9, the annulus is secured to the outer cylindrical drum 3 and, upon inflation, is arranged to contract into frictional engagement with the cylindrical face 7 of the inner rotatable member in establishing a resilient drive between the parts of the coupling or clutch.

The body of the annulus A comprises a circumferentially extending, preferably completely annular hollow ring formed of resilient rubber compounded in the same manner as and having substantially the same consistency as the rubber used in the manufacture of conventional pneumatic vehicle tires. The annulus is of flat cross section, having an axial dimension or width several times its radial dimension or thickness. Within the body of the annulus is a circumferentially extending internal chamber 8 which, in the normal or unstressed condition of the annulus, is radially flattened or substantially completely collapsed, having little or no radial thickness. This wide chamber is preferably completely annular so that high pressure pneumatic fluid introduced into the chamber distends the annulus uniformly about its entire circumferential extent.

Reinforcing cords 9 are embedded in the rubber of the annulus body and extend in embracing relation around the cavity 8 to limit the distension of the annulus. The cords are arranged so as not to interfere materially with circumferential expansion of the annulus, being disposed axially or on the bias.

The rubber body of the annulus includes inner and outer relatively thick sectioned portions 10 and 11 disposed respectively on the inside and outside of the inflation chamber 8. Embedded in the thick sectioned portions of the annulus at uniformly spaced intervals about inner and outer faces 18 and 19 are axially disposed channel-like reinforcing elements 14 and 15. These elements, rolled or stamped of brass or brass plated steel, have inturned flanges 16 directed toward one another. The channels of the reinforcements open through the inner and outer faces of the annulus with the inturned flanges substantially flush with the annulus faces 18 and 19.

In assembling the universal inflatable annulus A in either a contracting or expanding type of torque transmitting device, the undercut cross channels provided within the reinforcement elements 14 and 15, receive rolled or stamped metal retainers or slide cleats 20 which, on one side, lock the annulus in predetermined position on one of the rotatable members of the device and, on the other side, locate the friction block assemblies carried on the friction face of the annulus. The slide cleats are each of substantially uniform hat section from end to end, having a drop center portion 21 and offset coplanar flange portions 22.

In the expanding type of torque transmitting device, the retainers 20, secured as by welding or riveting, are disposed about the face 7 of the inner drum 6 in parallel relation to one another and at uniformly spaced intervals corresponding to the spacing of the inner reinforcements 14 of the annulus. To mount the annulus on the rotatable member, the end openings in the slots or grooves of the reinforcing elements 14 are aligned and matched with the retainers 20 and the annulus is then slid axially into position. Detents on the face 7 of the inner rotatable member are received in matching recesses 36, later described, molded in the confronting face 18 of the annulus to locate the parts and resist relative axial shifting.

The reinforcement elements 14 and 15 are arranged in pairs, one element of each pair being on the inside and the other element of each pair being on the outside of the annulus. The elements are each of less length than the width of the inflation chamber 8 so that although the reinforcement elements are bonded to the annulus body in which they are embedded as by an adhesive agent or by being vulcanized thereto, radial expansion and contraction of the annulus is not objectionably interfered with by the stiffening effect of the reinforcements. During expansion and contraction of the annulus, flexing occurs in annulus sidewall portions 23.

Each pair of reinforcing elements 14 and 15 are connected at their ends by resilient spring metal elements 25 which embrace the sidewall portions 23 of the annulus. Inturned flanges or tabs 26 on reduced width leg portions 27 of the C-shaped springs are received in socket slots 28 formed in the reinforcement elements 14 and 15 adjacent the ends of the latter. In this manner the C-shaped springs are located in predetermined positions relative to the annulus and are interlocked with the reinforcement elements to retain the parts in assembled relation. Recesses 30 are provided in the annulus sidewalls 23, these curved or semi-circular recesses extending radially between the ends of the reinforcement element pairs and receiving the C-springs 25 so that the latter are flush with the sidewalls of the annulus and are disposed flatwise against the annulus.

The C-springs 25 are over-formed so that the leg portions 27 in their normal or unstressed condition are closer together than when they are assembled about the collapsed annulus. It is thus necessary to distend the spring elements slightly in placing them in the sidewall recesses 30 and in the normal retracted condition of the annulus the spring elements 25 resiliently bias the reinforcement elements 14 and 15 of each pair toward one another to hold the annulus completely collapsed. Thus the spring elements provide a continuous force holding the inflatable annulus to its minimum radial dimension and insuring positive collapse of the annulus when inflating pneumatic fluid is released therefrom.

Although the outer face 19 of the annulus may be made to engage directly against the cylindrical friction face 4 of the outer rotatable member or drum, it is preferable to provide on the annulus heat and wear resistant blocks 32 formed of molded composition material such as that commonly used in vehicle brakes and clutch facings. These blocks are arcuately curved to correspond to the curvature of the drum face 4 and are bonded or attached as by countersunk rivets 34 to metal mounting plates 33. Recesses 36 are molded in both the inner face 18 and the outer face 19 of the annulus A. The recesses in the outer face receive heads 35 of the rivets 34 to locate the friction blocks thereon and to resist axial shifting of the blocks during operation. The molded in recesses 36 on the inner peripheral face 18 of the annulus receive similar detents 37 in the form of knobs or rivet heads formed on or attached to the face 7 of the inner rotatable member.

Each of the friction block assemblies is secured to the annulus by one or more of the slide cleats or retainers 20 interlocked with the outer reinforcing elements 15. The cleats are secured by welding or riveting to the central portions of the plates 33. In assembly, the ends of the outer slide cleats 20 are aligned with the end openings in the elements 15 and the cleats or retainers are then slid axially within the latter, the offset flanges 22 of the cleats being received behind the inturned flanges 16 of the reinforcement elements to hold the friction blocks in assembled relation with the annulus. The attaching plates 33 extend circumferentially beyond the ends of the friction blocks 32, one such extension portion of each plate being offset as indicated at 38 for overlapping relation with the extending plate portion of the adjacent friction block.

Inflation of the annulus A, in the expanding device, is effected through a tubular metal stem 40 connected as by a coupling 41, conduit 42 and suitable rotary connections to a suitable source of high pressure air or other pneumatic fluid. Conventional valves or other controls for governing the inflation and deflation of the annulus are included in the pneumatic fluid system. The stem 40 is embedded in the body of the annulus, preferably being bonded to the annulus as by vulcanization, and has an enlarged base portion 43.

Figs. 8 and 9 illustrate a suitable arrangement for utilizing the universal annulus A in a contracting type torque transmitting device. The annulus is held by the slide retainers or cleats 20 interlocked with the outer reinforcement elements 15, the cleats being secured as by welding or riveting to the inner face 4 of the outer drum 3 at uniformly spaced intervals about the inner circumference thereof. Thus the annulus is located in predetermined position and locked against relative circumferential movement. Detents 44, such as welded-on knobs or the heads of rivets, are provided on the inwardly directed face 4 of the outer rotatable member and are received in the matching recesses 36 in the confronting peripheral face 19 of the annulus.

The friction block assemblies for the contracting type torque transmitting device may be made according to several designs but are shown as comprising arcuately curved heat and wear resistant elements or blocks 45 bonded or secured as by countersunk rivets 46 to the concave inner faces of attaching elements or plates 47. The opposite ends of the plates 47 extend circumferentially beyond the blocks 45 and are formed with integral reversely bent flanges 48 that are received behind the flanges 16 of the inner retainers 14. Thus each of the friction block assemblies is interlocked at its ends with different retainers, the block assemblies individually being slidable axially relative to the annulus A in assembly. The molded in recesses 36 formed in the inner face 18 of the annulus A receive the heads of the rivets 46 to locate the friction block assemblies in predetermined positions against the annulus and to resist relative shifting movement.

In the contracting type friction or torque transmitting device, pneumatic inflating fluid from a suitable source and under conventional control is introduced into the annulus chamber 8 through a tubular metal stem 50 imbedded in the outer body portion 11 of the annulus and bonded in place as by vulcanization. The stem is formed with an enlarged or flared base 51 and the outer end of the stem passage is counterbored to receive a tubular fitting 52 which extends transversely through a connector tube 53. The tube 53 is attached as by a flanged element 54 to the flange of the drum 3 that is bolted to the rim 2 of the outer rotatable member C. Passages 55 in the disc of the outer rotatable member communicate with the valve stem 50 through the tubular connector 53 and fitting 52, suitable gaskets being provided to effect fluid-tight joints.

While the augmenting forces applied to the annulus A by the C-springs 25 to assist the inherent resiliency of the annulus in returning it to its normal or collapsed shape are desirable in the expanding type of torque transmitting device for the purpose of overcoming centrifugal forces encountered in rotation of the annulus, such augmentation is not required in the contracting type of device since frictional forces tend to return the annulus to its collapsed or normal shape. Hence, in a contracting type torque transmitting device, the spring elements 25 may be omitted, as shown in Figs. 8 and 9.

The annulus A may be made with either the inwardly extending inflation stem 40, the outwardly extending inflation stem 50, or both. When both inflation stems are provided in the annulus, the one not used in the assembly is cut off at or below the surface of the rubber body of the annulus and sealed as by a plug threaded or press fitted into the passage in the stem.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. In a torque transmitting device of the inflatable annulus type having a rotatable member on which the annulus is mounted, the annulus and the rotatable member having circumferentially extending mutually confronting meeting surfaces, the surface of the member being nonyielding to provide firm support for the annulus under radial loads, the improvement which comprises an elongated relatively thin metal channel-shaped reinforcing element of substantially C section recessed into said surface of the annulus and providing an undercut channel opening through said surface, and a retainer secured to the rotatable member and received interlockingly in the undercut channel to locate and secure the annulus on the rotatable member.

2. In a torque transmitting device having a rotatable member and a deformable resilient annulus mounted thereon, reinforcing elements secured to the annulus in pairs, the elements comprising metal strips each substantially wholly imbedded within the annulus and bonded thereto, one element of each pair being disposed adjacent the inner periphery of the annulus to provide an inner series of reinforcing elements, and the other element of each pair being disposed adjacent the outer periphery of the annulus to provide an outer series of reinforcing elements, retainers on the rotatable member interfitting with the reinforcing elements of one series to locate the annulus on the rotatable member, and friction block assemblies interfitting with the reinforcing elements of the other series to locate and secure the block assemblies on the annulus.

3. In a torque transmitting device having a rotatable member and a deformable resilient annulus mounted thereon, reinforcing elements secured to the annulus in pairs, the elements comprising metal strips each substantially wholly imbedded within the annulus and bonded thereto, one element of each pair being disposed adjacent the inner periphery of the annulus to provide an inner series of reinforcing elements, and the other element of each pair being disposed adjacent the outer periphery of the annulus to provide an outer series of reinforcing elements, retainers on the rotatable member interfitting with the reinforcing elements of one series to locate the annulus on the rotatable member, friction block assemblies interfitting with the reinforcing elements of the other series to locate and secure the block assemblies on the annulus, and interfitting detent and recess formations on the inner and outer peripheries of the annlus and the rotatable member and the friction block assemblies.

4. In a torque transmitting device having inner and outer rotatable members with spaced annular confronting faces, a resilient deformable annulus disposed in said space and having inner and outer surfaces one of which is disposed against one of the faces of the rotatable members, friction block assemblies disposed against the other surface of the annulus, recessed metal retaining elements embedded in the annulus adjacent each of the surfaces, and metal elements on said one face of the rotatable members and on the block assemblies extending through the surfaces of the annulus and receivable interlockingly in the retaining elements to locate the annulus against said one face and the block assemblies against said other surface of the annulus.

5. In a torque transmitting device of the type having an expansible and collapsible inflatable member disposed between the confronting faces of rotatable members, the improvement which comprises a plurality of resilient substantially C-shaped spring elements each disposed in embracing relation to and arranged to be distended upon expansion of the inflatable member to bias the latter toward collapsed condition, said elements having inturned ends interfitted in the inflatable member for locating the elements in predetermined positions relative to such member, and friction means carried by the inflatable member independently of the spring elements.

6. In a torque transmitting device a deformable annulus having a circumferentially extending internal chamber, said annulus in its normal unstressed condition being substantially flat in radial cross section, reinforcement elements embedded in the annulus on opposite sides of the inflation chamber, and resilient elements connecting the reinforcement elements and acting resiliently to retain the annulus in said normal condition.

7. In a torque transmitting device of the inflatable expansible annulus type, an improved annulus comprising a rubber body having a circumferentially extending inflation chamber, a pair of reinforcing elements embedded in the annulus, one at the inner periphery thereof and the other at the outer periphery thereof, and resilient means connecting the ends of the elements and yieldingly resisting expansion of the annulus.

8. In a torque transmitting device of the inflatable expansible annulus type, an improved annulus comprising a rubber body having a circumferentially extending inflation chamber, a pair of reinforcing elements embedded in the annulus, one adjacent the outer periphery thereof, and resilient means recessed in at least one side wall of the annulus and connecting the ends of the elements yieldingly to resist expansion of the annulus.

9. In a torque transmitting device having a resilient deformable annulus, reinforcing elements secured to the annulus in pairs adjacent the inner and outer peripheries of the annulus and spaced substantially uniformly circumferentially about the annulus, recesses in the annulus extending between the ends of inner and outer reinforcing elements, and resilient elements disposed in the recesses and connecting the ends of the reinforcing elements to control radial distension of the annulus.

10. In a torque transmitting device having a rotatable member and a deformable resilient annulus mounted thereon, a channel shaped metal reinforcing element of substantially C section embedded in the annulus to provide an elongated undercut recess with the channel recess opening through one of the peripheral faces of the annulus, a friction block assembly comprising a wear resistant body and a thin metal plate mounted on the annulus, and a metal retainer strip secured to the plate of the block assembly and interlocked with the reinforcing element, the retainer strip having an offset flange disposed in the undercut recess of the reinforcing element and longitudinally slidable therein for facile removal and replacement.

11. In a torque transmitting device having inner and outer rotatable members, a resilient annulus disposed between the members, said annulus being relatively flat in cross section and having generally cylindrical concentrically arranged inner and outer faces, elongated metal reinforcing elements embedded in the annulus in generally parallel relation to the rotational axis of the device, one series of such elements being adjacent and wholly below the outer face of the annulus and another series of such elements being adjacent and wholly below the inner face of the annulus, means interlocked with one series of the reinforcing elements for establishing a driving connection between the annulus and the inner rotatable member and means interlocked with the other series of reinforcing elements for establishing a driving connection between the annulus and the outer rotatable member.

12. A resilient deformable annulus for use in a torque transmitting device, said annulus comprising a hollow rubber body of generally flattened cross section having substantially parallel oppositely directed faces, metal reinforcements embedded in the body of the annulus substantially wholly between said faces, one series of the elements being adjacent one face and another series of the elements being adjacent the other face, and spring elements connecting the ends of the elements of one series with the ends of the elements of the other series.

13. An inflatable annulus for use in a torque transmitting device, the annulus comprising an inflatable rubber body having a pair of relatively narrow faces and a pair of oppositely directed relatively wide faces, elongated metal reinforcements extending across the wide faces, said reinforcements being embedded in the annulus substantially wholly below said wide faces, and spring elements extending across the narrow faces, the ends of the spring elements having connection with the reinforcements embedded in the opposite wide faces.

14. An inflatable annulus for use in a torque transmitting device, the annulus comprising an inflatable rubber body having a pair of relatively narrow faces and a pair of oppositely directed relatively wide faces, elongated metal reinforcements extending across the wide faces, said reinforcements being embedded in the annulus substantially wholly below said wide faces, the body of the annulus being formed with channels extending across the narrow faces between the ends of the reinforcements, and spring elements disposed in said channels, the ends of the spring elements having connection with the reinforcements in the opposite faces of the annulus.

15. An inflatable annulus for use in a torque transmitting device, the annulus comprising an inflatable rubber body having a pair of relatively narrow faces and a pair of oppositely directed relatively wide faces, elongated metal reinforcements extending across the wide faces, said reinforcements being embedded in the annulus substantially wholly below said wide faces and being formed with recesses adjacent their ends, and spring elements extending between the reinforcements, the spring elements being formed with angularly disposed end portions received within the end recesses of the reinforcements.

16. In combination in a torque transmitting device, inner and outer rotatable members, one of the members having an annular non-yielding face confronting and spaced from the other member, a deformable annulus in the space between the members for drivingly connecting such members, said annulus having a circumferential surface in bearing engagement against the non-yielding face of said one member to be supported thereby under radial loads, a plurality of channel shaped metal elements each substantially wholly embedded in and bonded to the annulus at circumferentially spaced points, the channels of said elements opening through the circumferential surface of the annulus, and retainers projecting rigidly from the non-yielding face of the one member, said retainers being received within the channel elements through said channel openings in interlocking relation to hold the annulus in assembled relation to the channel elements on the one member.

17. In combination in a torque transmitting device, inner and outer rotatable members, one of the members having an annular non-yielding face confronting and spaced from the other member, a deformable annulus in the space between the members for drivingly connecting such members, said annulus having a circumferential surface in bearing engagement against the non-yielding face of said one member to be supported thereby under radial loads, a plurality of elongated channel elements each substantially wholly embedded in the annulus, said elements being spaced circumferentially about the annulus and disposed in generally parallel relation to one another and to the rotational axis of the one rotatable member, and a plurality of retainers projecting rigidly from the non-yielding face of the one member, said retainers being slidingly received within the channel elements for bodily axial shifting of the annulus relative to the one rotatable member in assembly and disassembly and for interlockingly holding the annulus assembled on the one member to resist relative rotational movement.

18. In combination in a torque transmitting device, inner and outer rotatable members, one of the members having an annular non-yielding face confronting and spaced from the other member, a deformable annulus in the space between the members for drivingly connecting such members, said annulus having a circumferential surface in bearing engagement against the non-yielding face of said one member to be supported thereby under radial loads, a plurality of elongated channel elements each substantially wholly embedded in the annulus, said elements being spaced circumferentially about the annulus and disposed in generally parallel relation to one another and to the rotational axis of the one rotatable member, a plurality of retainers projecting rigidly from the non-yielding face of the one member, said retainers being slidingly received within the channel elements for bodily axial shifting of the annulus relative to the one rotatable member in assembly and disassembly and for interlockingly holding the annulus assembled on the one member to resist relative rotational movement, and interfitting detent formations on the engaged surface of the annulus and the non-yielding face of the said one member to locate the parts in predetermined relation in assembly and to resist relative axial shifting in operation.

19. In combination in a torque transmitting device, inner and outer rotatable members, an annulus of resilient deformable material mounted on one of the members, the annulus and the one rotatable member having circumferentially extending mutually confronting surfaces in bearing engagement, such surface of the rotatable member being firm and non-yielding for rigid support of the annulus under radial loads, the annulus and the one member also having a plurality of mutually interfitting channel and retainer formations spaced circumferentially about the engaged surfaces and arranged for relative axial movement of the annulus and said one rotatable member, the channel formations each having undercut walls providing lateral recesses in the channel formations and having an opening through one of the confronting surfaces, the retainer formations each having a pair of divergent flanges slidingly received in one of the channel formations with the edges of the flanges disposed in the lateral recesses, means on the annulus for effecting a driving connection between the annulus and the other rotatable member, and interfitting detent formations on the engaged surfaces to resist said relative movement of the annulus and the one rotatable member and to locate the annulus on the one rotatable member in predetermined relation.

20. In a torque transmitting device that includes a resilient deformable annulus having inner and outer faces and side faces, rigid reinforcing elements disposed transversely across and secured to the inner and outer faces of the annulus and spaced circumferentially about the annulus, and resilient C-shaped elements disposed radially across the side faces of the annulus and extending between and connected to corresponding ends of the inner and outer reinforcing elements to resist radial distension of the annulus, the C-shaped connecting and the rigid reinforcing elements having interlocked tab and slot ends to permit facile removal and replacement of the connecting C-shaped elements, the tabs being disposed to extend radially through the slots to prevent axial separation of the interlocked ends.

21. In a torque transmitting device that includes a resilient deformable annulus having inner and outer faces and side faces, reinforcing elements secured to the annulus in pairs, one element of each pair being embedded in the inner face of the annulus and the other element of each pair being embedded in the outer face of the annulus and the pairs of reinforcing elements being spaced circumferentially about the annulus, and resilient C-shaped elements disposed radially across the side faces of the annulus and extending between and connected to corresponding ends of each pair of inner and outer reinforcing elements to resist radial distension of the annulus.

HERMAN T. KRAFT.

REFERENCES CITED

The following references are of record in the file of this patent:

UNITED STATES PATENTS

| Number | Name | Date |
|---|---|---|
| 583,865 | Cowen | June 1, 1897 |
| 627,785 | Veazie et al. | June 27, 1899 |
| 1,272,852 | Robinson | July 16, 1918 |
| 2,251,445 | Fawick | Aug. 5, 1941 |
| 2,307,456 | Fawick | Jan. 5, 1943 |
| 2,428,933 | Fawick | Oct. 14, 1947 |
| 2,449,383 | Hunter | Sept. 14, 1948 |
| 2,480,947 | McEachran | Sept. 6, 1949 |
| 2,541,979 | Amundsen | Feb. 20, 1951 |

FOREIGN PATENTS

| Number | Country | Date |
|---|---|---|
| 448,798 | Great Britain | June 15, 1936 |
| 576,904 | Great Britain | Apr. 25, 1946 |